(12) United States Patent
Kim

(10) Patent No.: US 10,688,990 B2
(45) Date of Patent: Jun. 23, 2020

(54) APPARATUS AND METHOD FOR CONTROLLING COLLISION AVOIDANCE OF VEHICLE

(71) Applicant: MANDO CORPORATION, Pyeongtaek-si, Gyeonggi-do (KR)

(72) Inventor: Tae Han Kim, Seongnam-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 16/216,912

(22) Filed: Dec. 11, 2018

(65) Prior Publication Data

US 2019/0276013 A1    Sep. 12, 2019

(30) Foreign Application Priority Data

Mar. 8, 2018    (KR) .................. 10-2018-0027687

(51) Int. Cl.
*B60W 30/09* (2012.01)
*B60W 10/04* (2006.01)
(Continued)

(52) U.S. Cl.
CPC ............ *B60W 30/09* (2013.01); *B60W 10/04* (2013.01); *B60W 10/18* (2013.01); *B60W 10/20* (2013.01);
(Continued)

(58) Field of Classification Search
CPC ...... B60W 30/09; B60W 10/04; B60W 10/18; B60W 10/20; B60W 30/0956;
(Continued)

(56) References Cited

U.S. PATENT DOCUMENTS 9,691,282 B2    6/2017   Hartmann et al.
9,701,307 B1 *  7/2017   Newman et al. ..... B60W 30/09
                         (Continued)

FOREIGN PATENT DOCUMENTS

DE         10036276 A1    2/2002
DE      102014206338 A1   10/2015
                         (Continued)

OTHER PUBLICATIONS

Extended European Search Report dated Nov. 19, 2019 issued in European Patent Application No. 19156899.7.

*Primary Examiner* — Angelina Shudy
(74) *Attorney, Agent, or Firm* — Morgan, Lewis & Bockius LLP

(57) ABSTRACT

Disclosed are an apparatus and a method for controlling vehicle collision avoidance. The apparatus includes: a warning signal receiver configured to receive an emergency braking warning signal for a forward collision of a host vehicle; a traveling environment detector configured to detect object information, road information, and space information pertaining to areas in front of, to the side of, and in back of the host vehicle when the warning signal is received; an emergency braking determiner configured to determine whether a risk of a forward collision of the host vehicle is larger than or equal to a first threshold value when the warning signal is received; an avoidance area determiner configured to search for drivable lanes of the host vehicle and one or more candidate areas in the space according to the determined risk of the forward collision, calculate a score of each of the candidate areas, determine an avoidance area, and set an avoidance path for the avoidance area; and a control signal output unit configured to output steering and speed control signals for moving the host vehicle to the avoidance area along the avoidance path.

16 Claims, 13 Drawing Sheets

(51) Int. Cl.
    *B60W 10/18* (2012.01)
    *B60W 10/20* (2006.01)
    *B60W 30/095* (2012.01)
    *G06K 9/00* (2006.01)
    *B60W 30/08* (2012.01)
    *B60W 50/00* (2006.01)
    *G05D 1/02* (2020.01)
    *B60W 30/12* (2020.01)
    *B60W 30/085* (2012.01)

(52) U.S. Cl.
    CPC .......... *B60W 30/08* (2013.01); *B60W 30/085* (2013.01); *B60W 30/095* (2013.01); *B60W 30/0956* (2013.01); *B60W 30/12* (2013.01); *B60W 50/0097* (2013.01); *G05D 1/0214* (2013.01); *G06K 9/00798* (2013.01); *G06K 9/00805* (2013.01); *B60W 2420/42* (2013.01); *B60W 2552/00* (2020.02); *B60W 2554/00* (2020.02); *B60W 2554/80* (2020.02); *B60W 2555/60* (2020.02); *B60W 2710/18* (2013.01); *B60W 2710/20* (2013.01); *B60W 2720/106* (2013.01); *G05D 1/021* (2013.01); *G05D 2201/0213* (2013.01)

(58) Field of Classification Search
    CPC ......... B60W 2420/42; B60W 2550/10; B60W 2550/20; B60W 2550/22; B60W 2710/18; B60W 2710/20; B60W 2720/106; B60W 2550/255; B60W 2550/14; B60W 2550/30; B60W 30/08; B60W 30/085; B60W 30/30; B60W 30/095; B60W 30/12; B60W 50/0097; B60W 2552/00; B60W 2554/00; B60W 2554/80; B60W 2555/00; G06K 9/00798; G06K 9/00805; G05D 1/021; G05D 2201/0213; G05D 1/0214
    USPC .......................................................... 701/41
    See application file for complete search history.

(56) References Cited

U.S. PATENT DOCUMENTS

| | | | |
|---|---|---|---|
| 10,262,538 B1 * | 4/2019 | Milovich | G08G 1/144 |
| 2012/0130595 A1 * | 5/2012 | Hayakawa et al. | B60W 30/12 |
| 2018/0043887 A1 | 2/2018 | Newman et al. | |

FOREIGN PATENT DOCUMENTS

| | | | |
|---|---|---|---|
| JP | 2748287 B2 | 5/1998 | |
| KR | 10-2017-0068062 A | 6/2017 | |

* cited by examiner

APPARATUS AND METHOD FOR CONTROLLING COLLISION AVOIDANCE OF VEHICLE

CROSS REFERENCE TO RELATED APPLICATION

This application claims priority from Korean Patent Application No. 10-2018-0027687, filed on Mar. 8, 2018, which is hereby incorporated by reference for all purposes as if fully set forth herein.

BACKGROUND OF THE INVENTION

1. Field of the Invention

The present disclosure relates to a control apparatus and a control method for anticipating a collision with a vehicle or an obstacle ahead to provide an avoidance path during driving.

2. Description of the Prior Art

An emergency braking system, such as an Advanced Emergency Brake (AEB) system, determines the risk of a collision with a preceding vehicle and provides a warning, thereby assisting a driver in braking and performing autonomous emergency braking. A Time-To-Collision (TTC), which is a predicted collision time at which a collision between a host vehicle and a preceding vehicle is predicted, may be determined based on the distance between the host vehicle and the preceding vehicle, and the time point of an emergency braking warning and the time points of assistance of braking by the driver and autonomous emergency braking may be determined therethrough.

The advanced emergency brake system may operate on the basis of technology for detecting an object, such as adjacent vehicles and obstacles, through a plurality of radars and stereo cameras located at the front, side, and rear of the vehicle.

Further, lane-keeping control systems, such as a Lane-keeping Assist System (LKAS) and a Lane Departure Warning System (LDWS), are systems for acquiring lane information by detecting left and right lanes through a front camera and providing assist steering toque calculated to prevent the lane departure of the vehicle or to make the vehicle follow the center of the lane on the basis of the acquired lane information, so as to prevent lane departure and enable lane keeping through control of the transverse direction of the vehicle.

The lane-keeping control system may operate on the basis of technology for acquiring lane information on the basis of a forward image captured by the front camera and detecting the traveling state of the vehicle, such as the traveling speed, or road conditions, such as road curvature and road width.

However, technology used by the conventional autonomous emergency braking system and lane-keeping control system is mostly aimed at preparing for the risk of a collision with an object ahead, traveling in the same lane in which a host vehicle travels, and has a limit in that various avoidance paths of the host vehicle cannot be provided since misrecognition frequently occurs and accuracy deteriorates when a driving assist system detects adjacent vehicles and objects.

Accordingly, an autonomous emergency braking system and a lane-keeping control system that apply a combined sensor system using a radar, a lidar, and a camera sensor have recently been developed, but technology for easily providing a more reliable collision avoidance path is required.

SUMMARY OF THE INVENTION

Against this background, the present disclosure proposes an apparatus and a method for controlling collision avoidance, which provide an avoidance path and an avoidance area by anticipating a collision with vehicles or obstacles ahead or behind during traveling.

The problems to be solved by the present disclosure are not limited thereto, and other problems which have not been mentioned will be clearly understood by those skilled in the art from the following description.

In accordance with an aspect of the present disclosure, an apparatus for controlling collision avoidance is provided. The apparatus includes: a warning signal receiver configured to receive an emergency braking warning signal for a forward collision of a host vehicle; a traveling environment detector configured to detect object information, road information, and space information pertaining to areas in front of, to the side of, and in back of the host vehicle when the warning signal is received; an emergency braking determiner configured to determine whether the risk of a forward collision of the host vehicle is larger than or equal to a first threshold value when the warning signal is received; an avoidance area determiner configured to search for drivable lanes of the host vehicle and one or more candidate areas in the space according to the determined risk of the forward collision, calculate a score of each of the candidate areas, determine an avoidance area, and set an avoidance path for the avoidance area; and a control signal output unit configured to output steering and speed control signals for moving the host vehicle to the avoidance area along the avoidance path.

In accordance with another aspect of the present disclosure, a method of controlling collision avoidance is provided. The method includes: a warning signal reception step of receiving an emergency braking warning signal for a forward collision of a host vehicle; a traveling environment detection step of detecting object information, road information, and space information pertaining to areas in front of, to the side of, and in back of the host vehicle when the warning signal is received; an emergency braking determination step of determining whether the risk of a forward collision of the host vehicle is larger than or equal to a first threshold value when the warning signal is received; an avoidance area determination step of searching for drivable lanes of the host vehicle and one or more candidate areas in the space according to the determined risk of the forward collision, calculating a score of each of the candidate areas, determining an avoidance area, and setting an avoidance path for the avoidance area; and a control signal output step of outputting steering and speed control signals for moving the host vehicle to the avoidance area along the avoidance path.

As described above, according to the present disclosure, it is possible to provide safety of driving by controlling the vehicle to avoid a collision with a preceding object.

Further, there is an effect of improving accuracy of the avoidance path and the avoidance area to prevent a collision between vehicles.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
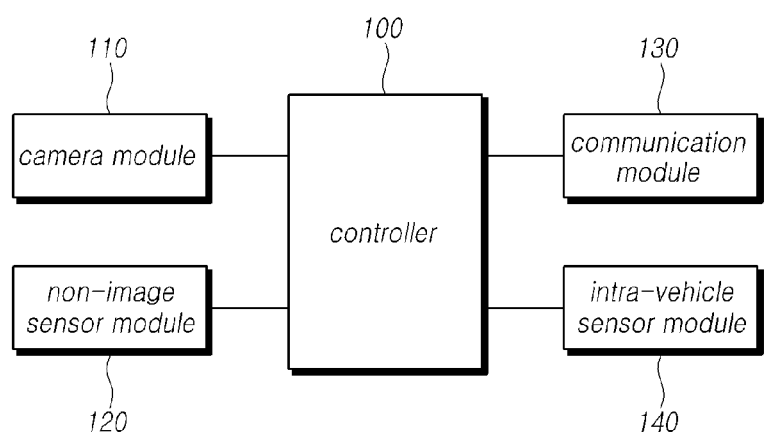
FIG. 1 is a block diagram illustrating a vehicle according to an embodiment.

Hereinafter, preferred embodiments of the present disclosure will be described in detail with reference to the accompanying drawings. The advantages and features of the present disclosure and methods of achieving the same will be apparent by referring to embodiments of the present disclosure as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

While the terms "first", "second", and the like may modify various elements, components, and/or sections, it will be apparent that such elements, components, and/or sections are not limited by the above terms. The above terms are used merely for the purpose of distinguishing an element, component, or section from other elements, components, or sections. Accordingly, it will be apparent that a first element, a first component, or a first section as mentioned below may be a second element, a second component, or a second section within the technical spirit of the present disclosure.

The terms as used herein are merely for the purpose of describing embodiments and are not intended to limit the present disclosure. As used herein, singular forms are intended to include plural forms unless the context clearly indicates otherwise. The terms "comprises" and/or "comprising" as used herein refer to the existence of a disclosed component, step, operation, and/or element, and do not exclude the existence of or a possibility of addition of one or more other components, steps, operations, and/or elements.

A vehicle in this specification may conceptually include a car, a motorcycle, and the like. Further, the vehicle may conceptually include all of an internal combustion engine car having an engine as a power source, a hybrid car including an engine and an electric motor as a power source, and an electric car having an electric motor as a power source. Hereinafter, a car will be described as a representative of such a vehicle.

In the following description, "front" means a forward driving direction of the vehicle and "rear" means a backward driving direction of the vehicle. Further, the left of the vehicle means the left when facing the forward driving direction and the right of the vehicle means the right when facing the forward driving direction. In addition, the rear side of the vehicle means the left or the right when facing the backward driving direction of the vehicle.

Hereinafter, embodiments of the present disclosure will be described in detail with reference to the accompanying drawings.

FIG. 1 is a block diagram illustrating a vehicle according to an embodiment.

Referring to FIG. 1, the vehicle may include a controller 170, a camera module 150, a non-image sensor module 160, a communication module 180, and an intra-vehicle sensor module 190. For example, the camera module 150 may include an image sensor, configured to have a field of view of an interior or an exterior of the vehicle and to capture image data, and a processor, configured to process the captured image data.

For example, the image sensor may be disposed in the vehicle to have a field of view of an interior or an exterior of the vehicle. At least one image sensor may be mounted to each part of the vehicle to have a field of view of the front, side, or rear of the vehicle.

Information on an image taken by the image sensor consists of image data, and thus may refer to image data captured by the image sensor. Hereinafter, information on an image taken by the image sensor means image data captured by the image sensor in the present disclosure. The image data captured by the image sensor may be generated, for example, in one format of AVI, MPEG-4, H.264, DivX, and JPEG in a raw form.

The image data captured by the image sensor may be processed by a processor. The processor may operate to process the image data captured by the image sensor.

With regard to the hardware implementation, the processor may be implemented using at least one of electrical units for processing image data and performing other functions, such as Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, micro-controllers, micro-processors.

Meanwhile, the non-image sensor module 160 is a sensor module other than the camera module 150 configured to capture an image. For example, a plurality of non-image sensor modules 160 may be disposed in the vehicle to have a field of view of an interior or an exterior of the vehicle, and may be configured to capture sensing data. The plurality of non-image sensor modules 160 may include, for example, radar sensors, lidar sensors, and ultrasonic sensors. The non-image sensor modules 160 may be omitted, or may be one or more in number.

The communication module 180 performs a function of performing communication between vehicles, communication between a vehicle and infrastructure, communication between a vehicle and a server, and communication inside a vehicle. To this end, the communication module 180 may include a transmission module and a reception module. For example, the communication module 180 may include a broadcast reception module, a wireless Internet module, a short-range communication module, a location information module, an optical communication module, and a V2X communication module.

The broadcast reception module receives broadcast signals or broadcast-related information from external broadcast management servers through broadcasting channels. Here, a broadcast includes at least one of a radio broadcast and a TV broadcast. The wireless Internet module may be a module for wireless Internet access, and may be mounted inside or outside the vehicle. The short-range communication module is for short-range communication and may support short-range communication through at least one of Bluetooth™, Radio-Frequency Identification (RFID), Infrared Data Association (IrDA), Ultra Wideband (UWB), Zig-Bee, Near Field Communication (NFC), Wi-Fi, Wi-Fi Direct, and wireless Universal Serial Bus (USB).

The location information module is a module for acquiring location information of the vehicle, a representative example thereof being a Global Positioning System (GPS) module. For example, through the use of the GPS module, the vehicle may acquire the location thereof using a signal transmitted from a GPS satellite. Meanwhile, in an embodiment, the location information module may be an element included in the internal sensor module 190 of the vehicle rather than an element included in the communication module 180.

The optical communication module may include an optical transmitter and an optical receiver. The optical transmitter and the optical receiver may convert a light signal into an electrical signal to transmit/receive information.

The V2X communication module is a module for wireless communication with a server, another vehicle, or an infrastructure device. The V2X communication module according to the present embodiments refers to the exchange of information between the vehicle and objects, such as another vehicle, a mobile device, and a road through a wired/wireless network, or technology therefor. The V2X communication module may encompass Vehicle-to-Vehicle (V2V), Vehicle-to-Infrastructure (V2I), Vehicle-to-Nomadic Device (V2N), and Vehicle-to-Pedestrian (V2P) concepts. The V2X communication module is based on Dedicated Short-Range Communications (DSRC), and may use Wireless Access in Vehicular Environment (WAVE) or IEEE 802.11p communication technology using a 5.9 GHz band, recently developed by IEEE, but is not limited thereto. It should be understood that V2X communication includes any communication between vehicles that does not exist at present but is to be developed in the future.

The intra-vehicle sensor module 190 of the vehicle is a sensor for sensing internal information of the vehicle. For example, the intra-vehicle sensor module 190 may be a torque sensor for sensing a steering torque, a steering angle sensor for sensing a steering angle, a motor location sensor for sensing information on a steering motor, a vehicle speed sensor, a vehicle motion detection sensor for sensing motion of the vehicle, and a vehicle position detection sensor. Additionally, the intra-vehicle sensor module 190 may be a sensor for sensing various pieces of data inside the vehicle, and the number thereof may be one or more.

The controller 170 may acquire data from at least one of the camera module 150, the non-image sensor module 160, the communication module 180, and the intra-vehicle sensor module 190 and control various operations of the vehicle on the basis of the acquired data. Alternatively, the controller 170 may acquire image data from the camera module 150 and process the image data. Further, the controller 170 may receive sensing data from the non-image sensor module 160 and process the sensing data. Alternatively, the controller 170 may acquire data from the intra-vehicle sensor module 190 or the communication module 180 and process the data. For such processing, the controller 170 may include at least one processor.

In addition, the controller 170 may control the operation of at least one of the camera module 150, the non-image sensor module 160, the communication module 180, and the intra-vehicle sensor module 190. The controller 170 may control the operation of various driver assistance systems installed in the vehicle.

Meanwhile, the radar sensor or the radar system used in the present disclosure may include at least one radar sensor unit, for example, one or more of a front detection radar sensor mounted to the front of the vehicle, a rear radar sensor mounted to the rear of the vehicle, and a side or a rear-side detection radar sensor mounted to each side of the vehicle. The radar sensor or the radar system may process data by analyzing a transmission signal and a reception signal and detect information on an object according to the processed data, and may include an Electronic Control Unit (ECU) or a processor therefor. Data transmission or signal communication from the radar sensor to the ECU may be performed through a communication link such as an appropriate vehicle network bus.

The radar sensor includes one or more transmission antennas for transmitting radar signals and one or more reception antennas for receiving signals reflected from an object.

Meanwhile, the radar sensor according to the present embodiment may adopt a multi-dimensional antenna array and a signal Multiple-Input Multiple-Output (MIMO) transmission/reception scheme in order to form a virtual antenna aperture larger than an actual antenna aperture.

For example, a two-dimensional antenna array is used to achieve horizontal and vertical angular accuracy and resolution. Through the two-dimensional radar antenna array, signals are transmitted/received by two individual horizontal and vertical scans (temporally multiplied), and MIMO may be used separately from the two-dimensional radar horizontal and vertical scans (temporally multiplied).

More specifically, the radar sensor according to the present embodiment may adopt a two-dimensional antenna array consisting of a transmission antenna unit including a total of 12 transmission antennas (Tx) and a reception antenna unit including 16 reception antennas (Rx), and as a result, may have a total of 192 virtual reception antenna arrangements.

The transmission antenna unit includes 3 transmission antenna groups including 4 transmission antennas, wherein a first antenna group may be vertically spaced apart from a second transmission antenna group by a predetermined distance and the first or second transmission antenna group may be horizontally spaced apart from a third transmission antenna group by a predetermined distance (D).

Further, the reception antenna unit may include 4 reception antenna groups, each of which includes 4 reception antennas, wherein the reception antenna groups may be vertically spaced apart from each other, and the reception antenna unit may be disposed between the first transmission antenna group and the third transmission antenna group, which are horizontally spaced apart from each other.

According to another embodiment, the antennas of the radar sensor are disposed in a two-dimensional antenna array. For example, each antenna patch is arranged in the shape of a rhombus, and thus the number of unnecessary side lobes may be reduced.

Alternatively, the two-dimensional antenna array may include a V-shaped antenna array in which a plurality of radial patches is disposed in a V shape, and, more particularly, may include two V-shaped antenna arrays. At this time, signal feeding may be performed at the apex of each V-shaped antenna array.

Alternatively, the two-dimensional antenna array may include an X-shaped antenna array, in which a plurality of radial patches is disposed in an X shape, and, more particularly, may include two X-shaped antenna arrays. At this time, signal feeding may be performed at the center of each X-shaped antenna array.

Further, the radar sensor according to the present embodiment may use a MIMO antenna system in order to implement accurate detection and resolution vertically and horizontally.

More specifically, in the MIMO system, respective transmission antennas may transmit signals having independent waveforms distinguished from each other. That is, each transmission antenna may transmit a signal having an independent waveform distinguished from those of other transmission antennas, and each reception antenna may identify which transmission antenna transmitted a reflected signal which is reflected from an object due to the different waveforms of the signals.

Further, the radar sensor according to the present embodiment may include a radar housing for accommodating a circuit and a substrate including transmission/reception antennas and a radome for configuring the exterior of the radar housing. At this time, the radome is formed with a material which can reduce attenuation of a transmitted/received radar signal, and may constitute a front/rear bumper of the vehicle, a grille, a side frame, or the exterior surface of components of the vehicle.

That is, the radome of the radar sensor may be disposed inside a vehicle grille, a bumper, or a frame. When the radar sensor is disposed as a part of the components constituting the exterior surface of the vehicle, such as the vehicle grille, the bumper, and part of the frame, it is possible to increase the aesthetic appearance of the vehicle and provide convenience in mounting the radar sensor.

The lidar may include a laser transmitter, a receiver, and a processor. The lidar may be implemented in a Time-Of-Flight (TOF) type or a phase-shift type.

The TOF-type lidar radiates a laser pulse signal and receives a reflected pulse signal from an object. The lidar may measure a distance from the object on the basis of the time at which the laser pulse signal is radiated and the time at which the reflected pulse signal is received. Further, the speed relative to the object may be measured on the basis of a change in the distance according to time.

Meanwhile, the phase-shift-type lidar may radiate a laser beam continuously modulated with a particular frequency and measure the time and the distance from the object on the basis of the phase change of the signal reflected and returned from the object. Further, the speed relative to the object may be measured on the basis of a change in the distance according to time.

The lidar may detect the object on the basis of the transmitted laser and detect the distance from the detected object and the relative speed. When the object is a stationary object (for example, street trees, a streetlamp, a traffic light, or a traffic sign), the lidar may detect the driving speed of the vehicle on the basis of the Time Of Flight (TOF) using the object.

The ultrasonic sensor may include an ultrasonic transmitter, a receiver, and a processor.

The ultrasonic sensor may detect an object on the basis of the transmitted ultrasonic wave and detect a distance from the detected object and a speed relative thereto. When the object is a stationary object (for example, street trees, a streetlamp, a traffic light, or a traffic sign), the ultrasonic sensor may detect the driving speed of the vehicle on the basis of the Time Of Flight (TOF) using the object.

The term of each element described above and an example of each element described above are only for convenience of understanding, but the present disclosure is not limited thereto. Hereinafter, in order to more accurately described embodiments according to the present disclosure, the above-described terms may be modified. Further, the elements included in the vehicle described in FIG. 1 are only examples, and thus the elements may be modified or omitted, or other elements may be added in order to more accurately described the technical idea of the present disclosure.

Figure 2:
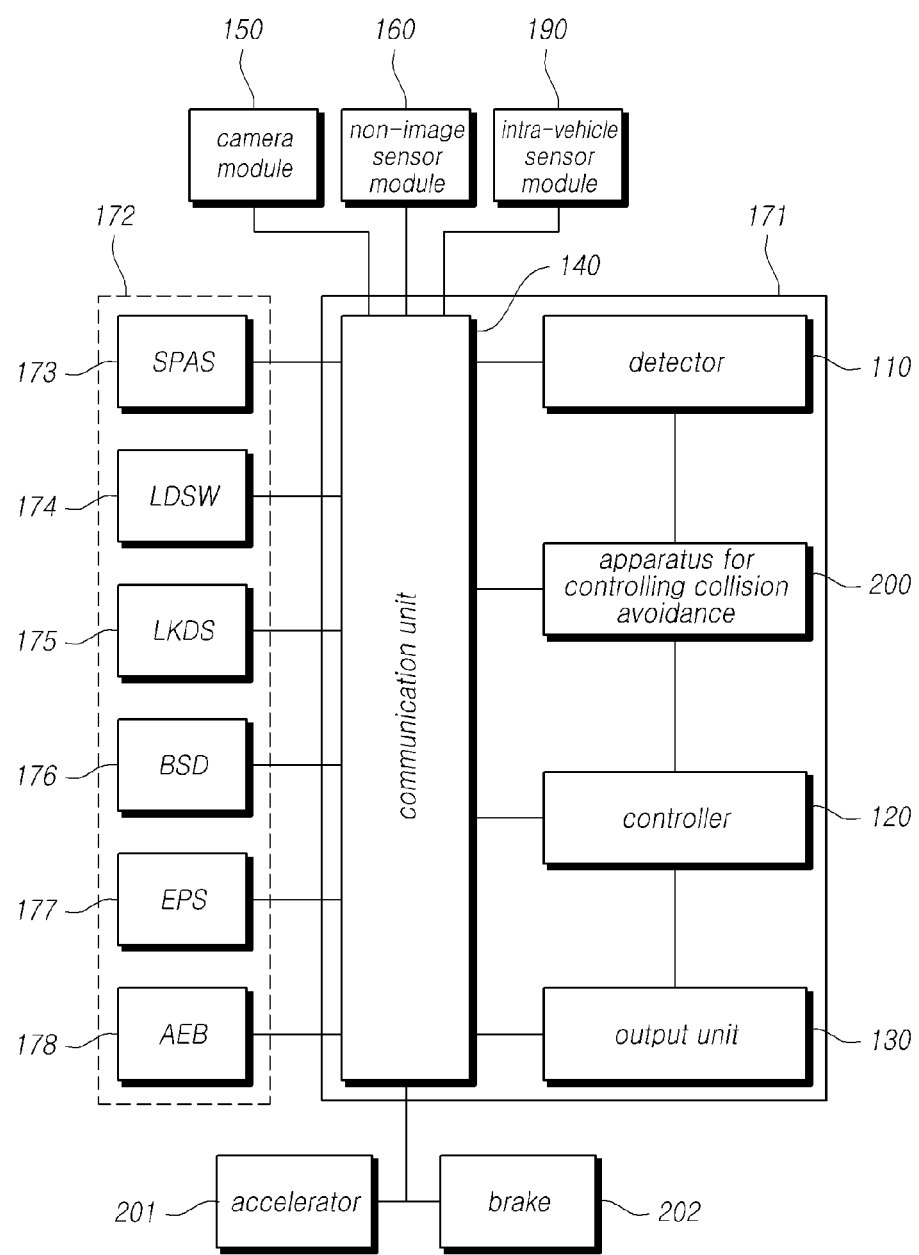
FIG. 2 illustrates a driving support system including an apparatus for controlling collision avoidance according to embodiments of the present disclosure.

FIG. 2 illustrates a driving support system including an apparatus 200 for controlling collision avoidance according to embodiments of the present disclosure.

An autonomous driving support integrated system may include an Advanced Emergency Brake (AEB) system, a Smart Parking Assisting System (SPAS), a Lane-Keeping Assist System (LKAS), a Lane Departure Warning System (LDWS), a Blind-Spot Detection (BSD) system, an Electric Power Steering (EPS or motor-driven power steering) module, an Electronic Stability Control (ESC) module, a driving system (an accelerator and a brake), a domain control unit, a camera module, a non-image sensor module, and an intra-vehicle sensor module.

Referring to FIG. 2, the vehicle may include at least one of a camera module 150, a non-image sensor module 160, and an intra-vehicle sensor module 190. Since the description thereof has been made with reference to FIG. 1, the description will be omitted.

Further, the vehicle may include a domain control unit 171.

The Domain Control Unit (DCU) 171 may be configured to receive image data captured by at least one image sensor, receive sensing data captured by a plurality of non-image sensors, and process at least one piece of the image data and the sensing data. For such processing, the DCU 171 may include at least one processor.

Alternatively, the domain control unit 171 may transmit and receive data to and from at least one of the camera module 150, the non-image sensor module 160, the intra-vehicle sensor module 190, and driver assistance system modules 172, and process the data received therethrough. That is, the DCU 171 may be located within the vehicle and communicate with at least one module mounted within the vehicle. To this end, the DCU 171 may further include an appropriate data link or communication link such as a vehicle network bus for data transmission or signal communication.

The DCU 171 may operate to control one or more of various driver assistance systems (DAS) used by the vehicle. For example, the domain control unit 171 may determine a particular situation, a condition, event occurrence, and performance of a control operation on the basis of data acquired from at least one of the modules 150, 160, 180, 190, 173, 174, 175, 176, and 178.

The DCU 171 may transmit a signal for controlling the operation of the various driver assistance system modules 172 included in the vehicle on the basis of the determined information. For example, the driver assistance system modules 172 may include an SPAS module 173, an LDWS module 174, an LKAS module 175, a BSD module 176, an EPS module 177, and an AEB module 178. In addition, the driver assistance system modules 172 included in the vehicle may be one of various systems, such as an ASCC, a system module, and an LCAS. The terms and names of the driver assistance systems described herein are only examples, and are not limiting. The driver assistance system modules 172 may include an autonomous driving module for autonomous driving. Alternatively, the domain control unit may control the vehicle to perform autonomous driving by controlling individual systems included in the driver assistance system modules 172.

At this time, the SPAS module 173 may be called an Intelligent Parking Assist System (IPAS) or an Advanced Parking Guidance System (APAS), which is a system for performing autonomous steering control to park the vehicle in or take the vehicle out of a parking spot by measuring the lengths of obstacles and the parking spot using an ultrasonic sensor or cameras located in the front, rear, and side of the vehicle and recognizing a space in which the parking is possible.

The LKAS module 174 and the LDWS module 175 are driving support systems included in the vehicle, which correspond to systems for performing transverse direction of the vehicle to prevent lane departure and enable lane keeping by acquiring lane information by detecting left and right lanes through a front camera and providing calculated assist steering torque to a steering device of the vehicle in order to prevent lane departure of the vehicle or make the vehicle follow the center of the lane on the basis of the acquired lane information.

The BSD module 176 may include a sensor on the side surface of the vehicle to detect a rear blind spot. For example, the BSD system may recognize whether there is an object in a blind spot through a radar sensor installed on the side surface of the vehicle and, when it is determined that there is an object in the blind spot, provide a warning to the driver, and transmit a predetermined command to a control device of the vehicle, thereby performing driving control for safe vehicle driving.

Further, the EPS module 177 is a device for controlling the driving direction of the vehicle by controlling the front wheels or all four wheels of the vehicle to have appropriate angles and may generate assist steering torque according to the rotation of the steering wheel of the vehicle due to manipulation by the driver.

A brake 202 of the vehicle is a device for reducing the driving speed of the vehicle, stopping the vehicle, or maintaining a stopped state, and may uniformly distribute the braking power to respective wheels or selectively control the braking power of a particular wheel so as to generate braking power of the vehicle when the vehicle is braked. An accelerator 201 of the vehicle, conceptually opposite the brake, is a device for increasing the driving speed of the vehicle, and may generate the driving power of the vehicle by increasing the engine RPM and the engine power.

The AEB module 178 includes a radar sensor, and when there is an object in front of the moving vehicle, performs emergency braking regardless of whether the driver brakes the vehicle on the basis of the relative speeds of the object and the vehicle and the separation distance therebetween. Specifically, a detector 110 may include at least one of the camera module 150 and the non-image sensor module 160 illustrated in FIGS. 1 and 2. In general, the detector 110 may be a radar disposed on the front of the host vehicle, but is not limited thereto, and the radar may be a lidar. Further, the detector 110 may receive required information from various sensors included in the autonomous driving support integrated system through a communication unit 140.

A controller 120 determines a front or rear object through various pieces of driving information and object information received from the detector 110 and determines whether the vehicle will collide with the object. When a collision situation is determined, the controller 120 determines whether collision avoidance is possible. At this time, the vehicle may generate a command signal for controlling the vehicle to avoid the collision and transmit the command signal to an output unit 130. The controller 120 may transmit the command signal to various systems for driving the vehicle through the communication unit 140 so as to generate steering assist torque of the EPS or generate braking power or driving power in each wheel of the vehicle through the brake 202 and the accelerator 201.

At this time, the apparatus 200 for controlling collision avoidance may be linked to the controller 120, and may determine an avoidance area and an avoidance path to avoid the collision of the vehicle and output a control signal to the controller 120.

The output unit 130 is a device for providing a warning to the driver of the vehicle and may provide various warnings in visual, acoustic, and tactile manners according to the collision risk. Further, the output unit 130 may output an emergency braking warning according to the collision risk of the vehicle. That is, the emergency braking warning may be output in various manners according to the range of the collision risk calculated by the controller 120.

The communication unit 140 may transmit and receive various pieces of information and command signals as described above through communication with the autonomous driving support integrated system.

The communication unit 140 may include mobile communication networks including an Integrated Services Digital Network (ISDN), an Asymmetric Digital Subscriber Line (ADSL), a Local Area Network (LAN), an Ethernet, a Controller Area Network (CAN), a TCP/IP-based communication network, an optical communication network, CDMA, and WCDMA, and short-range communication networks, such as ZigBee and Bluetooth.

Figure 3:
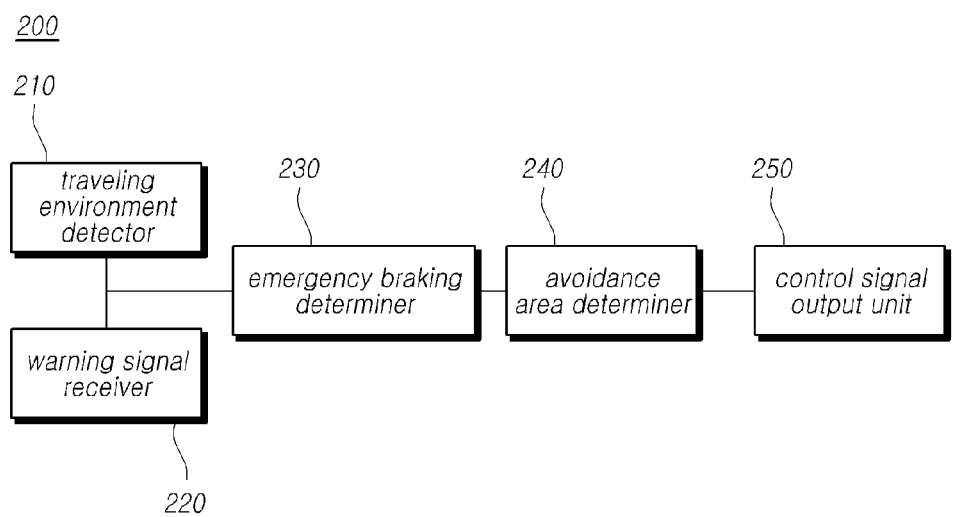
FIG. 3 is a block diagram illustrating the apparatus for controlling collision avoidance according to embodiments of the present disclosure.

FIG. 3 is a block diagram illustrating the apparatus 200 for controlling collision avoidance according to embodiments of the present disclosure.

Referring to FIG. 3, the apparatus 200 for controlling collision avoidance according to the present disclosure may include: a warning signal receiver 210 configured to receive an emergency braking warning signal for a forward collision of a host vehicle; a traveling environment detector 220 configured to detect object information, road information, and space information pertaining to areas in front of, to the side of, and in back of the host vehicle when the warning signal is received; an emergency braking determiner 230 configured to determine whether the risk of a forward collision of the host vehicle is larger than or equal to a first threshold value when the warning signal is received; an avoidance area determiner 240 configured to search for drivable lanes of the host vehicle and one or more candidate areas in the space according to the determined risk of the forward collision, calculate a score of each of the candidate areas, determine an avoidance area, and set an avoidance path for the avoidance area; and a control signal output unit 250 configured to output steering and speed control signals for moving the host vehicle to the avoidance area along the avoidance path.

Specifically, the warning signal receiver 210 may receive an emergency braking warning signal from the output unit 130 of the AEB system, and the emergency braking warning signal may be a phased warning signal. For example, the emergency braking warning signal may have a plurality of risk levels, and may particularly have two level.

For example, when the emergency braking warning signal is a primary warning, the steering wheel of the host vehicle is vibrated and a warning sound is output, so that the driver of the host vehicle may recognize the risk of collision. When the emergency braking warning signal is a secondary warning, the collision may be prevented by controlling the brake of the host vehicle to decrease the speed.

When the warning signal receiver 210 receives the emergency braking warning signal, a driving environment detector 220 and an emergency braking determiner 230 of the apparatus 200 for controlling collision avoidance may be activated.

When the warning signal receiver 210 receives the warning signal, the driving environment detector 220 may detect at least one of object information, road information, and space information or may receive at least one piece of the object information, the road information, and the space information from the autonomous driving support integrated system within the host vehicle. The object information, the road information, and the space information are information detected by the camera module 150, the non-image sensor module 160, and the intra-vehicle sensor module 190 illustrated in FIGS. 1 and 2, information extracted by the detector 110 of FIG. 2 from data captured by the camera module 150, the non-image sensor module 160, and the intra-vehicle sensor module 190, or information directly extracted by the driving environment detector 210.

For example, the object information, the road information, and the space information in front of the vehicle may be detected by a camera and a radar mounted to the front of the host vehicle and radars mounted to both front-side surfaces, and the object information, the road information, and the space information in back of the vehicle may be detected by a camera mounted to the rear of the host vehicle and radars mounted to both rear-side surfaces.

Accordingly, the driving environment detector 220 may include the driving assistance system and a Controller Area Network (CAN), a Local Interconnect Network (LIN), and FlexRay for communication with various sensors, but is not limited thereto, and any communication schemes used by vehicle networks may be included in the scope of the present disclosure.

That is, the term "detection" in this specification should be understood to mean acquiring corresponding information and includes not only direct detection by the driving environment detector 220 but also acquisition of information detected from an external device.

The emergency braking determiner 230 may calculate the forward collision risk on the basis of information received from the AEB system. When the forward collision risk is higher than or equal to a first threshold value, the emergency braking determiner 230 may determine that the forward collision is generated when the host vehicle performs a full-braking operation.

The forward collision risk may be calculated on the basis of a Time-To-Collision (TTC), which is a value generated by dividing a separation distance between the host vehicle and a preceding object, that is, another vehicle, by a relative speed.

A braking limit may be calculated when the forward collision risk is calculated. The braking limit means the risk of a forward collision even though the host vehicle performs the full-braking operation. That is, when the collision risk is the braking limit, it may be determined that there is a high collision possibility since the forward TTC of the host vehicle is shorter even though the host vehicle performs full braking.

When the forward collision risk calculated by the emergency braking determiner 230 is higher than or equal to the first threshold value, the avoidance area determiner 240 may search for a drivable way and a candidate area on the basis of at least one piece of the detected object information, road information, and space information.

The candidate area is located behind or beside the host vehicle to make the vehicle avoid the forward collision, and the number of candidate areas may be one or more. The avoidance area may be selected from among the candidate areas. The first threshold value may be a value indicating the braking limit.

The object information may include object type information for identifying whether the front, rear, or side object is an obstacle, a road structure, a pedestrian, or another vehicle and object size information, the road information may include information on a lane of a road on which the host vehicle travels and the road type, and the space information may include information on an empty space other than the object, that is, location information and the lane width of a space through which the host vehicle can travel on the basis of the vehicle width and a vehicle length of the host vehicle.

For example, the object information may determine the type of the object, indicating a pedestrian or a vehicle, and determine whether the road adjacent to the road on which the host vehicle travels is a sidewalk, a shoulder, or a roadway, so as to determine a drivable way that can be selected as the candidate area.

The avoidance area determiner 240 may convert and calculate scores on the basis of at least one piece of information on the drivable way, the information on objects located in front of and in back of the candidate area, the candidate area, and the space information of the host vehicle.

The object information used for calculating the scores may include at least one of the object type, the location, the speed, and the risk of collision with the host vehicle, the drivable way information may include the type and location of the driving way adjacent to the driving way in which the host vehicle travels, and the candidate area and the space information of the host vehicle may include the lane width of the candidate area and the vehicle width of the host vehicle.

That is, when the drivable way is a roadway, it may be determined whether the roadway is a first lane, a third lane, or a fourth lane, and scores are calculated. For example, assuming that a reference score is 100, the reference score may be reduced if the roadway is the first lane or is adjacent to the centerline.

When the object is a vehicle, the location of the vehicle, the speed, the driving direction, and the risk of collision with the host vehicle may be calculated and converted into scores. For example, when it is assumed that the reference score is 100, the reference score may be further reduced as the risk of collision with the host vehicle is higher.

The lane width of the candidate area may be detected on the basis of data captured by the camera module or the non-image sensor module, the vehicle width of the host vehicle may be identified, and they may be converted into scores. For example, when it is assumed that the reference score is 100, the reference score may be reduced if a value generated by subtracting the vehicle width of the host vehicle from the lane width of the candidate area is larger than 0 and smaller than a vehicle width threshold value.

Accordingly, it is possible to calculate the score of the candidate area by summing up the score of each of the drivable ways, the space score of the candidate area, and the score of the object.

The avoidance area determiner 240 may determine that the candidate area having the largest score is an avoidance area when the calculated score is larger than or equal to a second threshold value, and search for a drivable way and the candidate area again when the score is smaller than the second threshold value.

According to an embodiment, when the calculated score is larger than or equal to the second threshold value and the number of candidate areas having the largest score is plural, the avoidance area determiner 240 may determine that the candidate area farthest from the centerline is an avoidance area.

The control signal output unit 250 may output the steering and speed control signals according to the avoidance path set by the avoidance area determiner 240 to move the host vehicle to the avoidance area.

The steering control signal is a signal for controlling the driving direction of the host vehicle along the avoidance path by adjusting the direction of front wheels or rear wheels of the host vehicle to appropriate angles, and may be transmitted to the EPS.

The speed control signal is a signal for decreasing the speed of the host vehicle by operating the brake for applying a frictional force to disks of the front wheels or the rear wheels of the host vehicle or increasing the speed of the host vehicle by accelerating the engine rotation, and may be transmitted to the electronic control brake or the accelerator.

The electronic control brake may adopt an Electronic Stability Control (ESC) system, an Anti-lock Brake System (ABS), an Automatic Stability Control (ASC) system, and a Dynamic Stability Control (DSC) system.

As described above, the present disclosure may provide safety of driving by easily controlling the host vehicle to avoid a collision with a forward object.

The function performed by each element of the apparatus for controlling collision avoidance may be performed by the controller illustrated in FIG. 1 or the domain control unit itself illustrated in FIG. 2.

Figure 4A:
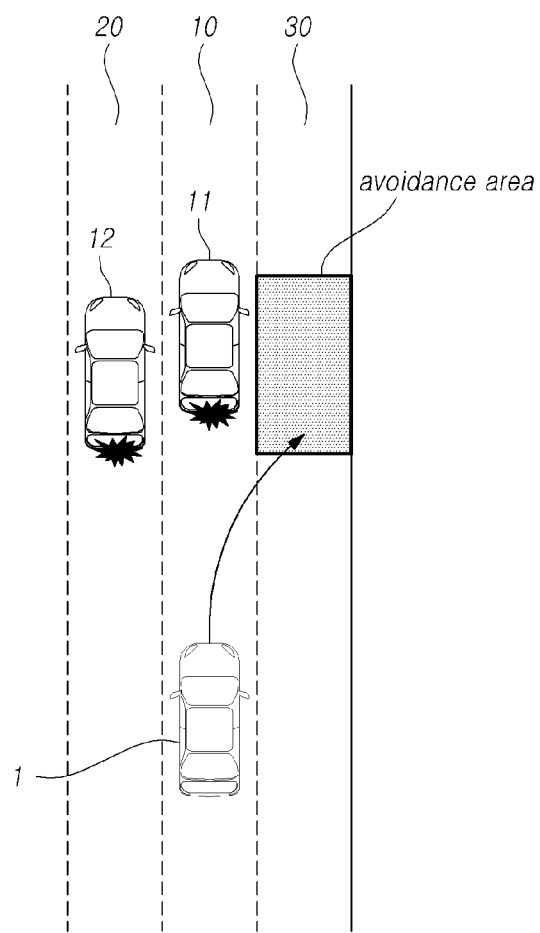
FIGS. 4A and 4B illustrate examples in which the vehicle including the apparatus for controlling collision avoidance avoids a forward collision according to embodiments of the present disclosure.
Figure 4B:
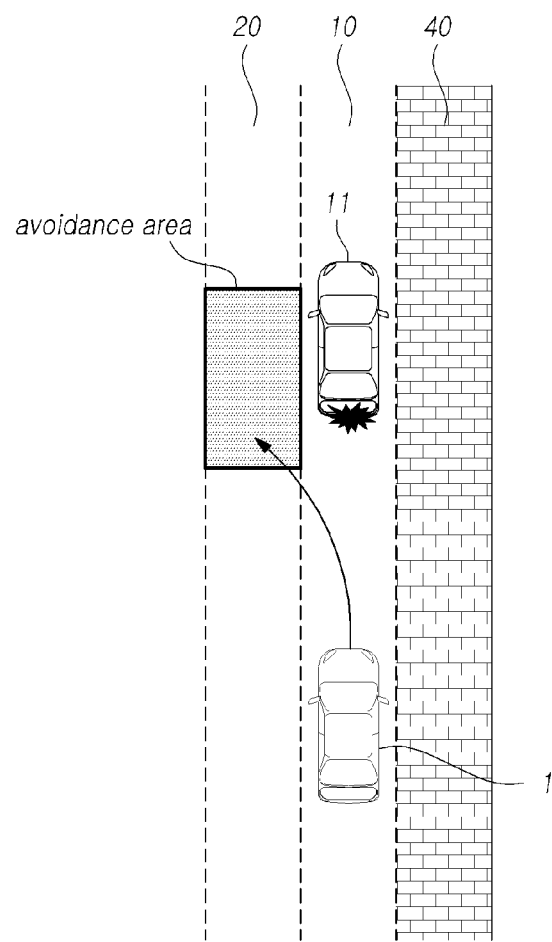

FIGS. 4A and 4B illustrate examples in which a vehicle including the apparatus 200 for controlling collision avoidance avoids a forward collision according to embodiments of the present disclosure.

FIG. 4A illustrates the case in which the risk of a collision with a first preceding vehicle 11, located ahead in a traveling lane 10 in which a host vehicle 1 travels, and a second preceding vehicle 12, located in a first adjacent lane 20 adjacent to the traveling lane 10, is detected.

At this time, since the host vehicle 1 includes the apparatus 200 for controlling collision avoidance, the host vehicle 1 may search for an avoidance area and set an avoidance path so as to prevent the forward collision. That is, a second adjacent lane 30, which is adjacent to the traveling lane 10 and in which no other vehicle is detected, is decided on as an optimal avoidance area in consideration of at least one piece of object information, space information, and road information around the host vehicle 1, and thus the host vehicle 1 may move to the avoidance area (the rectangular area illustrated in FIG. 4A) in the second adjacent lane 30.

FIG. 4B illustrates the case in which the risk of a forward collision with the preceding vehicle 11 located ahead in the traveling lane 10 in which the host vehicle 1 travels is detected.

One of the two lanes 20 and 40 adjacent to the traveling lane 10 is detected as a roadway 20 and the other one is detected as a pedestrian walkway 40 in consideration of at least one piece of object information, space information, and road information around the host vehicle 1. The lane adjacent to the traveling lane 10 is referred to as a first adjacent lane 20 and the pedestrian walkway is referred to as a sidewalk 40.

At this time, since the first adjacent lane 20, in which no other vehicle is detected, is the optimal avoidance area, the host vehicle 1 may move to the avoidance area (the rectangular area illustrated in FIG. 4B) in the first adjacent lane 20.

Figure 5A:
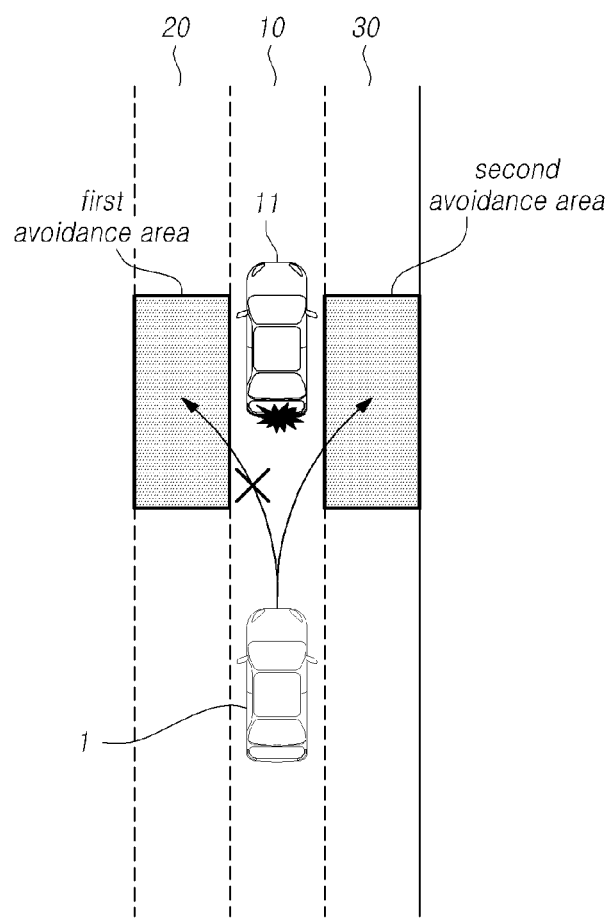
FIGS. 5A to 5C illustrate other examples in which the vehicle including the apparatus for controlling collision avoidance avoids a forward collision according to embodiments of the present disclosure.
Figure 5B:
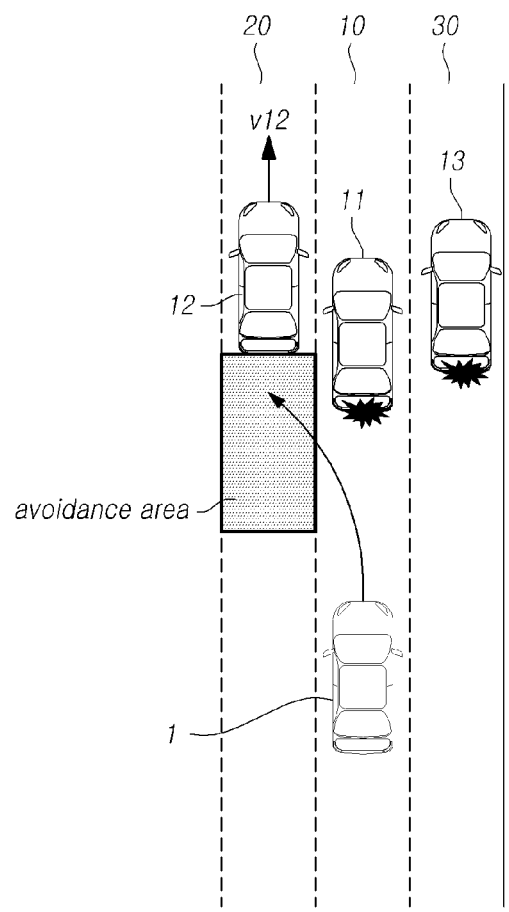
Figure 5C:
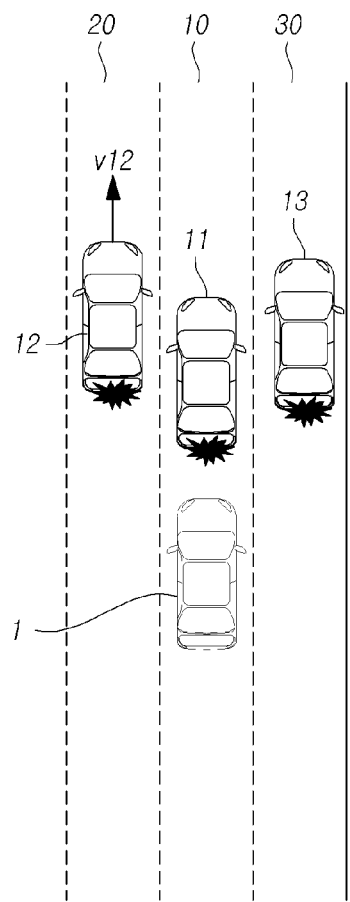

FIGS. 5A to 5C illustrate other examples in which the vehicle including the apparatus 200 for controlling collision avoidance avoids the forward collision according to embodiments of the present disclosure.

FIG. 5A illustrates the case in which the risk of a forward collision with a first preceding vehicle 11, located ahead in a traveling lane 10 in which the host vehicle 1 travels, is detected.

At this time, since the host vehicle 1 includes the apparatus 200 for controlling collision avoidance, the host vehicle 1 may search for an avoidance area and set an avoidance path so as to prevent a forward collision. That is, since no other vehicle is detected in the first adjacent lane 20 and the second adjacent lane 30, which are adjacent to the traveling lane 10, in consideration of at least one piece of object information, space information, and road information around the host vehicle 1, a first avoidance area and a second avoidance area may be selected as candidate areas, as illustrated in FIG. 5A.

However, when the first adjacent lane 20 is a first lane adjacent to the centerline, the reference score of the first avoidance area is set to be reduced, so that the second avoidance area located in the second adjacent lane 30 may be the optimal avoidance area. Accordingly, the host vehicle 1 may move to the second avoidance area in the second adjacent lane 30.

FIG. 5B illustrates the case in which the risk of a forward collision with the first preceding vehicle 11, located ahead in the traveling lane 10 in which the host vehicle 1 travels, is detected, a second preceding vehicle 12 travels in the first adjacent lane 20, which is adjacent to the traveling lane 10, and a third preceding vehicle 13 travels in the second adjacent lane 30.

At this time, since the driving speed u12 of the second preceding vehicle 12 is faster than the driving speed of the third preceding vehicle 13 in consideration of at least one piece of object information, space information, and road information around the host vehicle 1, the optimal avoidance area may be an avoidance area (a rectangular area illustrated in FIG. 5B) located in the first adjacent lane 20.

FIG. 5C illustrates the case in which the risk of a forward collision with the first preceding vehicle 11, located ahead in the traveling lane 10 in which the host vehicle 1 travels, is detected, wherein the second preceding vehicle 12 travels in the first adjacent lane 20, which is adjacent to the traveling lane 10, and the third preceding vehicle 13 travels in the second adjacent lane 30, but the driving speed of the second preceding vehicle 12 and the driving speed of the third preceding vehicle 13 are slow, so that the risk of a forward collision with the host vehicle 1 is detected.

At this time, since an avoidance area for the host vehicle 1 cannot be found, the speed of the host vehicle 1 may be reduced, the object information, the space information, and the road information around the host vehicle 1 may be detected in real time, and a candidate area may be immediately searched for again.

Figure 6A:
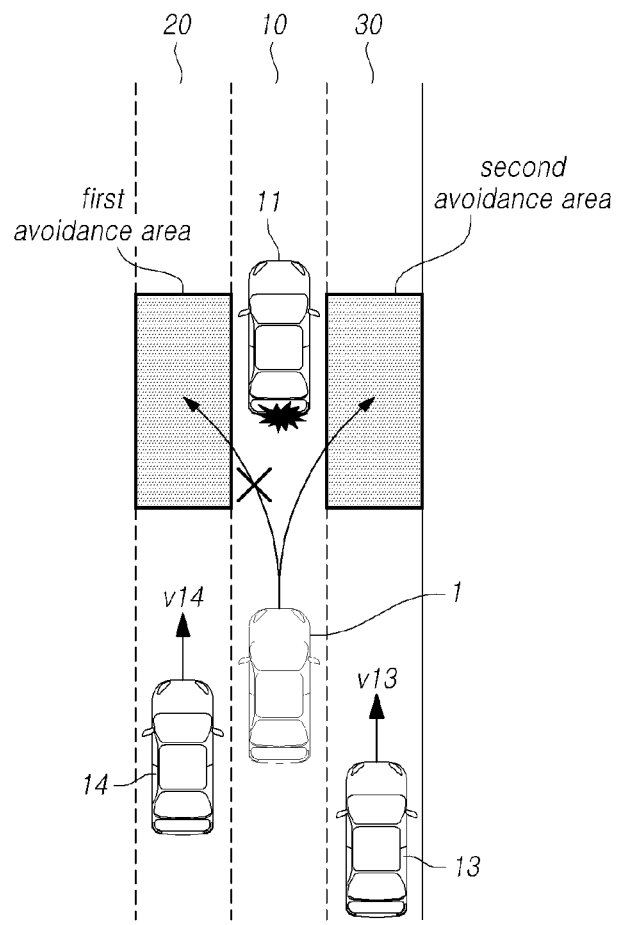
FIGS. 6A to 6C illustrate other examples in which the vehicle including the apparatus for controlling collision avoidance avoids a forward collision according to embodiments of the present disclosure.
Figure 6B:
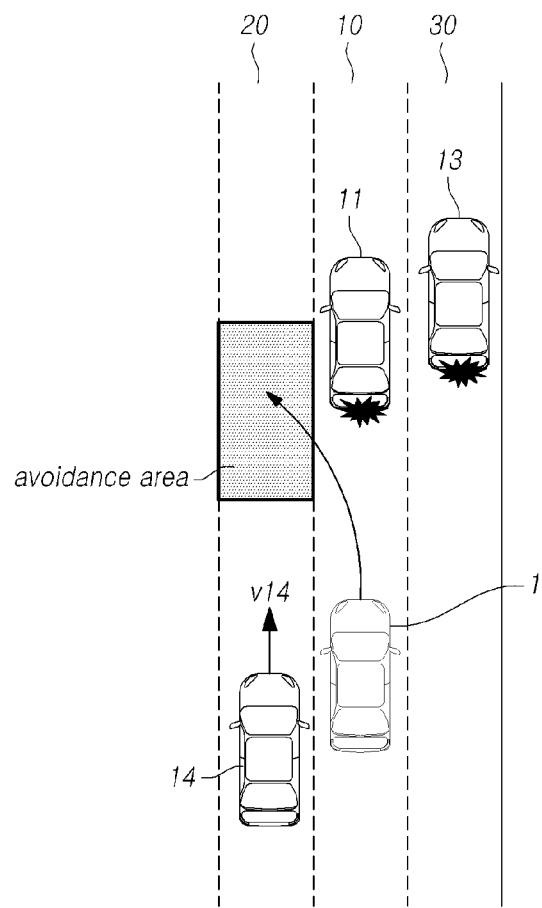
Figure 6C:
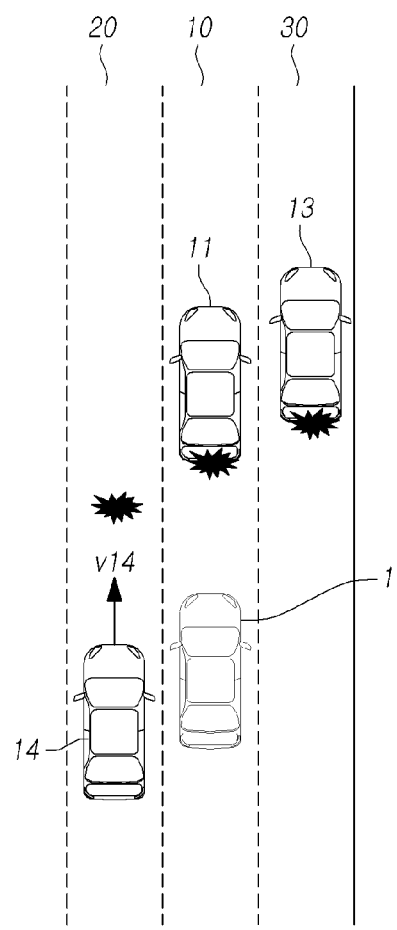

FIGS. 6A to 6C illustrate other examples in which the vehicle including the apparatus 200 for controlling collision avoidance avoids a forward collision according to embodiments of the present disclosure.

FIG. 6A illustrates the case in which the risk of forward collision with the first preceding vehicle 11, located ahead in the traveling lane 10 in which the host vehicle 1 travels, is detected. A fourth following vehicle 14 travels in the first adjacent lane 20, which is adjacent to the traveling lane 10, at a traveling speed u14, and a third following vehicle 13 travels in the second adjacent lane 30 at a traveling speed u13.

At this time, since the host vehicle 1 includes the apparatus 200 for controlling collision avoidance, the host 1 may search for an avoidance area and set an avoidance path so as to prevent a forward collision. That is, since spaces are detected in the first adjacent lane 20 and the second adjacent lane 30, which are adjacent to the traveling lane 10, in consideration of at least one piece of object information, space information, and road information around the host vehicle 1, a first avoidance area and a second avoidance area may be selected as candidate areas, as illustrated in FIG. 6A.

However, when the traveling speed u14 of the fourth following vehicle 14 traveling in the first adjacent lane 20 is fast enough to cause a rear-end collision with the host vehicle 1, the reference score of the first avoidance area is set to be reduced, and the optimal avoidance area may be the second avoidance area, which is located in the second adjacent lane 30. Accordingly, the host vehicle 1 may move to the second avoidance area in the second adjacent lane 30.

FIG. 6B illustrates the case in which the risk of a forward collision with the first preceding vehicle 11, located ahead in the traveling lane 10 in which the host vehicle 1 travels, is detected, wherein the fourth following vehicle 12 travels in the first adjacent lane 20, which is adjacent to the traveling lane 10 at a traveling speed u14 and the third preceding vehicle 13 travels in the second adjacent lane 30.

At this time, since there is the risk of a forward collision between the host vehicle 1 and the third preceding vehicle 13 and the traveling speed u14 of the fourth following vehicle 14 is slow enough not to cause a rear-end collision with the host vehicle 1 in consideration of at least one piece of object information, space information, and road information around the host vehicle 1, the optimal avoidance area may be an avoidance area (a rectangular area illustrated in FIG. 6B) located in the first adjacent lane 20.

FIG. 6C illustrates a case which is the same as the case of FIG. 6B, but there is the risk of a forward collision between the host vehicle 1 and the third preceding vehicle 13 and the traveling speed u14 of the fourth following vehicle 14 is fast enough to generate a rear-end collision with the host vehicle 1.

At this time, since the avoidance area of the host vehicle 1 cannot be determined, the speed of the host vehicle 1 may be reduced, the object information, the space information, and the road information around the host vehicle 1 may be detected in real time, and a candidate area may be immediately searched for again.

Accordingly, there is an effect of more accurately detecting an avoidance path and an avoidance area to prevent a forward collision with the host vehicle 1 by detecting the traveling environment of the host vehicle 1, such as the object information, the space information, and the road information, and using the traveling environment for determining the avoidance area.

Figure 7:
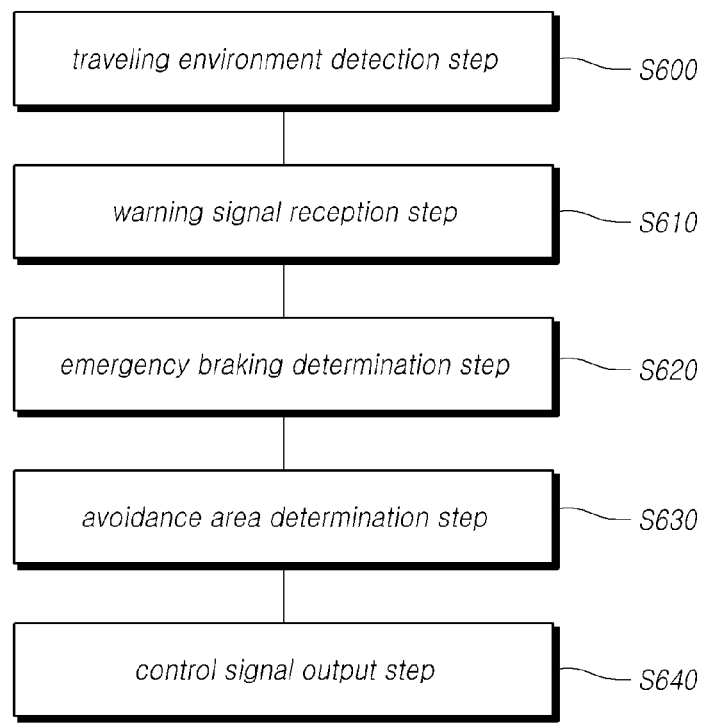
FIG. 7 is a flowchart briefly illustrating a method of controlling collision avoidance according to embodiments of the present disclosure.

FIG. 7 is a flowchart briefly illustrating a method of controlling collision avoidance according to embodiments of the present disclosure.

A method of controlling collision avoidance may include: a warning signal reception step S600 of receiving an emergency braking warning signal for a forward collision of a host vehicle; a traveling environment detection step S610 of detecting object information, road information, and space information pertaining to areas in front of, to the side of, and in back of the host vehicle when the warning signal is received; an emergency braking determination step S620 of determining whether the risk of a forward collision of the host vehicle is larger than or equal to a first threshold value when the warning signal is received; an avoidance area determination step S630 of searching for drivable lanes of the host vehicle and one or more candidate areas in the space according to the determined risk of the forward collision, calculating a score of each of the candidate areas, determining an avoidance area, and setting an avoidance path for the avoidance area; and a control signal output step S640 of outputting steering and speed control signals for moving the host vehicle to the avoidance area along the avoidance path.

Specifically, in a warning signal reception step S600, an emergency braking warning signal may be received from the output unit 130 of the AEB system and the emergency braking warning signal may be a phased warning signal. For example, the emergency braking warning signal may have a plurality of risk levels and, particularly, a two-step level.

When the emergency braking information signal is received in the warning signal reception step S600, a traveling environment detection step S610 and an emergency braking determination step S620 may be performed.

When the warning signal is received in the warning signal reception step S600, at least one piece of object information, road information, and space information may be detected, or at least one piece of object information, road information, and space information may be received from the autonomous driving support integrated system within the host vehicle in the warning signal reception step S610. The object information, the road information, and the space information are information detected by the camera module 150, the non-image sensor module 160, and the intra-vehicle sensor module 190 illustrated in FIGS. 1 and 2, information extracted by the detector 110 of FIG. 2 from data captured by the camera module 150, the non-image sensor module 160, and the intra-vehicle sensor module 190 illustrated in FIGS. 1 and 2, or information directly extracted by the driving environment detector 210.

For example, the object information, the road information, and the space information in front of the vehicle may be detected by a camera and a radar mounted to the front of the host vehicle and radars mounted to both front-side surfaces, and the object information, the road information, and the space information in back of the vehicle may be detected by a camera mounted to the rear of the host vehicle and radars mounted to both rear-side surfaces.

In the emergency braking determination step S620, the forward collision risk may be calculated on the basis of information received from the AEB system. When the forward collision risk is higher than or equal to a first threshold value, it may be determined that the forward collision will occur when the host vehicle performs a full-braking operation.

The forward collision risk may be calculated on the basis of a Time-To-Collision (TTC), which is a value generated by dividing a separation distance between the host vehicle and a preceding object, that is, another vehicle, by a relative speed.

When the forward collision risk calculated in the emergency braking determination step S620 is higher than or equal to the first threshold value, drivable lanes and candidate areas may be searched for on the basis of at least one piece of the detected object information, road information, and space information in the avoidance area determination step S630.

The candidate area is located behind or beside the host vehicle to make the vehicle avoid the forward collision, and the number of candidate areas may be one or more. The avoidance area may be selected from among the candidate areas.

In the avoidance area determination step S630, the score may be converted and calculated on the basis of information on the drivable lanes, information on objects located in front of or in back of the candidate areas, and space information of the candidate areas and the host vehicle.

The object information used for calculating the scores may include at least one of the object type, the location, the speed, and the risk of collision with the host vehicle, information on the drivable way may include the type and location of the way adjacent to the traveling lane in which the host vehicle travels, and the candidate area and the space information of the host vehicle may include the lane width of the candidate area and the vehicle width of the host vehicle.

The candidate area having the largest score may be determined as the avoidance area when the calculated score is larger than or equal to a second threshold value, and the drivable lanes and the candidate areas may be searched for again when the score is smaller than the second threshold value in the avoidance area determination step S630.

According to an embodiment, when the calculated score is larger than or equal to the second threshold value and the number of candidate areas having the largest score is plural, the avoidance area determiner 240 may determine that the candidate area farthest from the centerline is the avoidance area.

In the control signal output step S640, steering and speed control signals according to the avoidance path set in the avoidance area determination step S630 may be output, and may allow the host vehicle to move the avoidance area.

Figure 8:
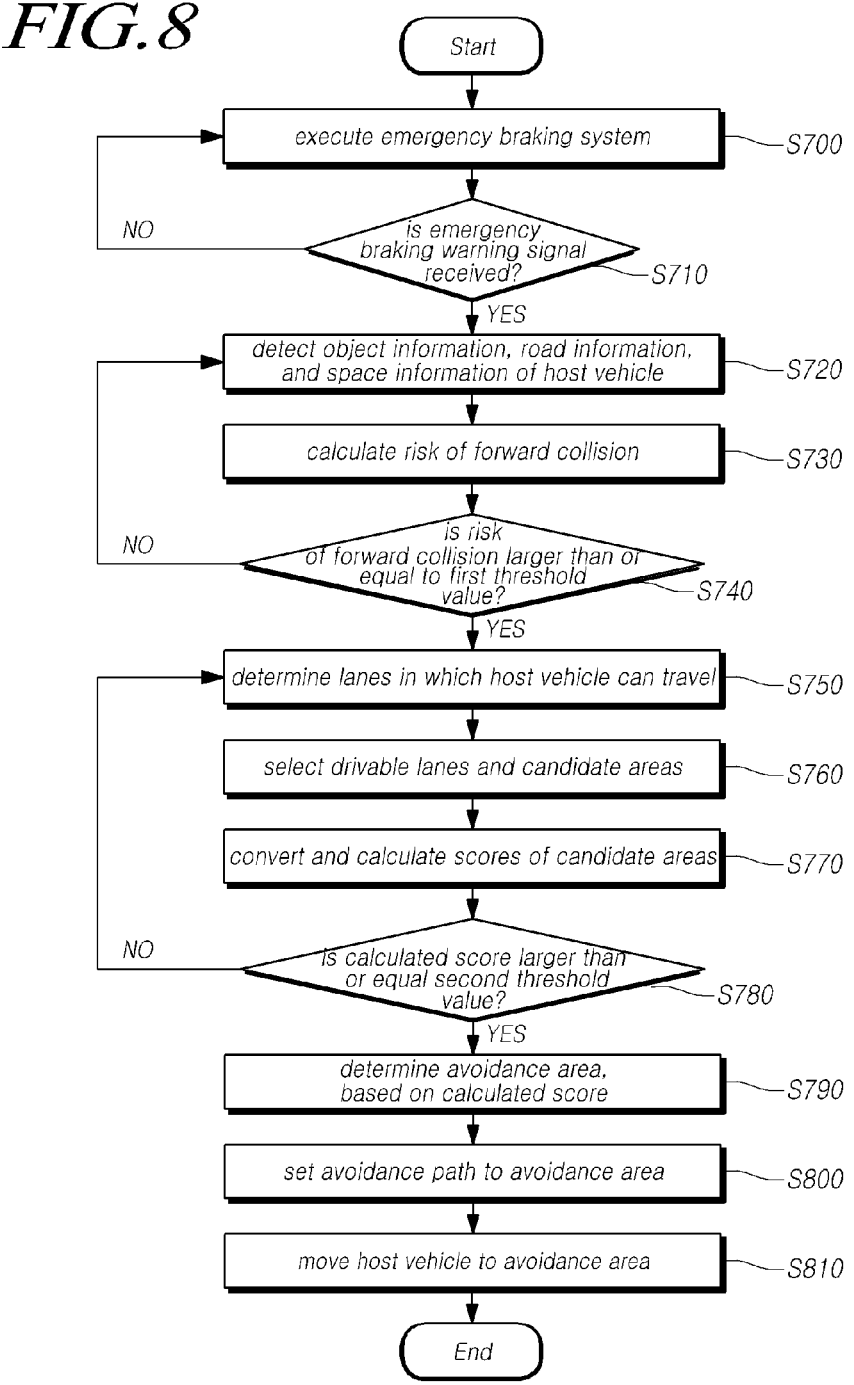
FIG. 8 is a flowchart illustrating in detail the method of controlling collision avoidance according to embodiments of the present disclosure.

FIG. 8 is a flowchart illustrating in detail the method of controlling collision avoidance according to embodiments of the present disclosure.

Referring to FIG. 8, when an autonomous emergency braking (AEB) system is executed in the host vehicle in S700, the AEB system determines whether an emergency braking warning signal, output when the risk of the forward collision of the host vehicle is detected, is received in S710 in the warning signal reception step S600. At this time, the emergency braking warning signal may include a plurality of risk levels and, particularly, a two-step level.

Simultaneously with the reception of the emergency braking warning signal, at least one piece of the object information, the road information, and the space information pertaining to the front, rear, and side of the host vehicle is detected in S720 in the traveling environment detection step S610.

In the emergency braking determination step S620, the risk of the forward collision may be calculated through the detected information in S730. At this time, the risk of the forward collision may be calculated on the basis of a Time-To-Collision (TTC), which is a value generated by dividing a separation distance between the host vehicle and a preceding object, that is, another vehicle, by a relative speed.

It is determined whether the calculated risk of the forward collision is larger than or equal to a first threshold value in S740. The first threshold value is a braking limit indicating the risk of the forward collision even though the host vehicle performs the full-braking operation. That is, when the collision risk is the braking limit, it may be determined that there is a very high collision possibility since the forward TTC of the host vehicle is short even though the host vehicle performs full braking.

Accordingly, when the risk of the forward collision is smaller than the first threshold value, the traveling environment detection step S600 is continuously performed. That is, at least one piece of the object information, the road information, and the space information pertaining to the front, rear, and side of the host vehicle is detected in S720.

When the risk of the forward collision is larger than or equal to the first threshold value, it is determined whether there is a drivable lane among the traveling lane and adjacent lanes on the basis of the object information and the road information in S750 in the avoidance area determination step S630.

For example, it is determined whether the object information corresponds to a pedestrian or a vehicle and whether a road adjacent to the road on which the host vehicle travels is a sidewalk, a shoulder, or a roadway, so as to determine the drivable way that can be selected as the candidate area.

Simultaneously with the determination of the drivable way, candidate areas are searched for and selected in S760. The candidate areas may be searched for on the basis of at least one piece of the object information, the road information, and the space information.

At this time, scores may be converted and calculated on the basis of information on the drivable way and information on objects located in front of and in back of the candidate area in S770.

The object information used for calculating the scores may include at least one of the type of the object, the location, the speed, and the risk of collision with the host vehicle, and the information on the drivable way may include the type and the location of the way adjacent to the traveling lane in which the host vehicle travels.

In the avoidance area determination step S630, it is determined whether the calculated score is larger than or equal to a second threshold value in S780.

When the score is smaller than the second threshold value, the drivable way and the avoidance area are searched for again in S750.

When the calculated score is larger than or equal to the second threshold value, the candidate area having the largest score is determined as the avoidance area in S790. Simultaneously with the determination of the avoidance area, an avoidance path along which the host vehicle moves to the avoidance area is set in S800.

The host vehicle is moved by outputting steering and speed control signals to make the host vehicle move to the avoidance area along the avoidance path set in the control signal output step S640 in S810.

The steering and speed control signals may be transmitted to at least one of the EPS, the brake, and the accelerator of the host vehicle.

As described above, the apparatus and the method for controlling collision avoidance have an effect of providing safety of traveling, preventing a collision between vehicles, and improving accuracy of the avoidance path and the avoidance area by controlling a vehicle to avoid a collision with a preceding object.

Even if it was described above that all of the components of an embodiment of the present disclosure are coupled as a single unit or coupled to be operated as a single unit, the present disclosure is not necessarily limited to such an embodiment. That is, at least two elements of all structural elements may be selectively joined and operate without departing from the scope of the present disclosure.

The above embodiments of the present disclosure have been described only for illustrative purposes, and those skilled in the art will appreciate that various modifications and changes may be made thereto without departing from the scope and spirit of the disclosure. The scope of the present disclosure shall be construed on the basis of the accompanying claims in such a manner that all of the technical ideas included within the scope equivalent to the claims belong to the present disclosure.

What is claimed is:

1. A system for controlling collision avoidance, the system comprising:
    a camera module disposed in a host vehicle to have a field of view of an interior or an exterior of the host vehicle and configured to capture image data and process the captured image data; and
    a controller configured to perform processing, based at least partially on processing of the image data,
    wherein the controller comprises:
        a warning signal receiver configured to receive an emergency braking warning signal for a forward collision of the host vehicle;
        a traveling environment detector configured to detect object information, road information, and space information pertaining to areas in front of, to a side of, or in back of the host vehicle, based at least partially on the processed image data when the warning signal is received;
        an emergency braking determiner configured to determine whether a risk of the forward collision of the host vehicle is larger than or equal to a first threshold value when the warning signal is received;
        an avoidance area determiner configured to search for drivable lanes of the host vehicle and one or more candidate areas in a space according to the determined risk of the forward collision, calculate a score of each of the one or more candidate areas, determine an avoidance area based on the calculated score, and set an avoidance path for the avoidance area; and
        a control signal output unit configured to output steering and speed control signals for moving the host vehicle to the avoidance area along the avoidance path,
    wherein, when the calculated score is larger than or equal to a second threshold value, the avoidance area determiner determines a candidate area having a largest score among the one or more candidate areas, each having a score larger than or equal to the second threshold value, to be the avoidance area, and
    wherein, when the calculated score is smaller than the second threshold value, the avoidance area determiner searches for the drivable lanes and the one or more candidate areas again.

2. The system of claim 1, wherein the risk of the forward collision is calculated based on a time at which the forward collision of the host vehicle is predicted and a separation distance between the host vehicle and an object ahead.

3. The system of claim 1, wherein, when the risk of the forward collision is larger than or equal to the first threshold value, the emergency braking determiner determines that the forward collision is to occur when the host vehicle performs a full-braking operation.

4. The system of claim 1, wherein, when the risk of the forward collision is larger than or equal to the first threshold value, the avoidance area determiner searches for the drivable lanes and the one or more candidate areas based on at least one piece of the detected object information, road information, and space information.

5. The system of claim 1, wherein the avoidance area determiner converts and calculates the score based on information on the drivable lanes, information on objects in front and in back of the one or more candidate areas, and space information of the one or more candidate areas and the host vehicle.

6. The system of claim 5, wherein the information on the objects in front and in back of the one or more candidate areas comprises at least one piece of a type, a location, and a speed of the objects, and a risk of a collision with the host vehicle.

7. The system of claim 5, wherein the information on the drivable lanes comprises a type and a location of the lanes.

8. The system of claim 5, wherein the space information of the one or more candidate areas and the host vehicle comprises a lane width of the one or more candidate areas and a vehicle width of the host vehicle.

9. The system of claim 1, wherein when the calculated score is larger than or equal to a second threshold value, the avoidance area determiner determines a candidate area having a largest score among the one or more candidate areas, each having a score larger than or equal to the second threshold value, to be the avoidance area, and
    when there are plural candidate areas having the largest score, the avoidance area determiner determines a candidate area from the plural candidate areas farthest from a centerline of a road to be the avoidance area.

10. A system for controlling collision avoidance, the system comprising:
    a camera module disposed in a host vehicle to have a field of view of an interior or an exterior of the host vehicle and configured to capture image data and process the captured image data;
    at least one non-image sensor module disposed in the host vehicle to have a field of view of an interior or an exterior of the host vehicle and configured to capture sensing data and process the captured sensing data;
    an emergency braking system module configured to perform emergency braking, based on a relative speed and a separation distance between an object existing in front of the host vehicle and the host vehicle; and
    a domain control unit configured to process the captured image data and sensing data and control at least one driver assistance system module included in the host vehicle comprising the emergency braking system module, wherein the domain control unit receives an emergency braking warning signal for a forward collision of the host vehicle, detects object information, road information, and space information pertaining to areas in front of, to a side of, or in back of the host vehicle, based at least partially on the processed image data and sensing data when the warning signal is received, determines whether a risk of the forward collision of the host vehicle is larger than or equal to a first threshold value when the warning signal is received, searches for drivable lanes of the host vehicle and one or more candidate areas in a space according to the determined risk of the forward collision, calculates a score of each of the one or more candidate areas, determines an avoidance area based on the calculated score, and sets an avoidance path for the avoidance area, and outputs steering and speed control signals for moving the host vehicle to the avoidance area along the avoidance path, wherein, when the calculated score is larger than or equal to a second threshold value, the domain control unit determines a candidate area having a largest score among the one or more candidate areas, each having a score larger than or equal to the second threshold value, to be the avoidance area, and wherein, when the calculated score is smaller than the second threshold value, the domain control unit searches for the drivable lanes and the one or more candidate areas again.

11. An apparatus for controlling collision avoidance, the apparatus comprising:

a warning signal receiver configured to receive an emergency braking warning signal for a forward collision of a host vehicle;

a traveling environment detector configured to detect object information, road information, and space information pertaining to areas in front of, to the side of, and in back of the host vehicle when the warning signal is received;

an emergency braking determiner configured to determine whether a risk of a forward collision of the host vehicle is larger than or equal to a first threshold value when the warning signal is received;

an avoidance area determiner configured to search for drivable lanes of the host vehicle and one or more candidate areas in a space according to the determined risk of the forward collision, calculate a score of each of the one or more candidate areas, determine an avoidance area based on the calculated score, and set an avoidance path for the avoidance area; and a control signal output unit configured to output steering and speed control signals for moving the host vehicle to the avoidance area along the avoidance path, wherein, when the calculated score is larger than or equal to a second threshold value, the avoidance area determiner determines a candidate area having a largest score among the one or more candidate areas, each having a score larger than or equal to the second threshold value, to be the avoidance area, and wherein, when the calculated score is smaller than the second threshold value, the avoidance area determiner searches for the drivable lanes and the one or more candidate areas again.

12. A method of controlling collision avoidance, the method comprising:

a warning signal reception step of receiving an emergency braking warning signal for a forward collision of a host vehicle;

a traveling environment detection step of detecting object information, road information, and space information pertaining to areas in front of, to the side of, and in back of the host vehicle when the warning signal is received;

an emergency braking determination step of determining whether a risk of a forward collision of the host vehicle is larger than or equal to a first threshold value when the warning signal is received;

an avoidance area determination step of searching for drivable lanes of the host vehicle and one or more candidate areas in a space according to the determined risk of the forward collision, calculating a score of each of the one or more candidate areas, determining an avoidance area based on the calculated score, and setting an avoidance path for the avoidance area; and a control signal output step of outputting steering and speed control signals for moving the host vehicle to the avoidance area along the avoidance path, wherein the avoidance area determination step includes:
when the calculated score is larger than or equal to a second threshold value, determining a candidate area having a largest score among the one or more candidate areas, each having a score larger than or equal to the second threshold value, to be the avoidance area, and when the calculated score is smaller than the second threshold value, searching for the drivable lanes and the one or more candidate areas again.

13. The method of claim 12, wherein the emergency braking determination step comprises, when the risk of the forward collision is larger than or equal to the first threshold value, determining that the forward collision is to occur when the host vehicle performs a full-braking operation.

14. The method of claim 12, wherein the avoidance area determination step comprises, when the risk of the forward collision is larger than or equal to the first threshold value, searching for the drivable lanes and the one or more candidate areas based on at least one piece of the detected object information, road information, and space information.

15. The method of claim 12, wherein the avoidance area determination step comprises converting and calculating the score, based on information on the drivable lanes and information on objects in front and in back of the one or more candidate areas.

16. The method of claim 12, wherein the avoidance area determination step comprises determining a candidate area having a largest score when the calculated score is larger than or equal to a second threshold value, and searching for the drivable lanes and the one or more candidate areas again when the calculated score is smaller than the second threshold value.

* * * * *